(12) United States Patent  
Green (10) Patent No.: US 7,808,883 B2
(45) Date of Patent: Oct. 5, 2010

(54) MULTICARRIER MODULATION WITH ENHANCED FREQUENCY CODING

(75) Inventor: Marilynn P. Green, Pomona, NY (US)

(73) Assignee: Nokia Corporation, Espoo (FI)

( * ) Notice: Subject to any disclaimer, the term of this patent is extended or adjusted under 35 U.S.C. 154(b) by 1033 days.

(21) Appl. No.: 11/200,247

(22) Filed: Aug. 8, 2005

(65) Prior Publication Data

US 2007/0030796 A1 Feb. 8, 2007

(51) Int. Cl.
  *H04J 11/00* (2006.01)
(52) U.S. Cl. ............ 370/208; 370/206; 375/260; 375/346
(58) Field of Classification Search ........ 370/203, 370/206, 208, 209, 310; 375/260, 267, 346, 375/347, 348
  See application file for complete search history.

(56) References Cited

U.S. PATENT DOCUMENTS

| 5,732,113 | A * | 3/1998 | Schmidl et al. ............ 375/355 |
| 5,771,224 | A * | 6/1998 | Seki et al. ................ 370/206 |
| 5,867,478 | A * | 2/1999 | Baum et al. .............. 370/203 |
| 6,185,257 | B1 * | 2/2001 | Moulsley .................. 375/260 |
| 6,628,735 | B1 * | 9/2003 | Belotserkovsky et al. ... 375/355 |
| 7,012,882 | B2 * | 3/2006 | Wang et al. .............. 370/208 |
| 2002/0034213 | A1 | 3/2002 | Wang et al. |
| 2003/0060165 | A1 * | 3/2003 | Horisaki .................. 455/67.4 |
| 2003/0072395 | A1 * | 4/2003 | Jia et al. .................. 375/341 |
| 2005/0123023 | A1 * | 6/2005 | Smith et al. ............... 375/130 |
| 2005/0237923 | A1 * | 10/2005 | Balakrishnan et al. ...... 370/208 |
| 2005/0259758 | A1 * | 11/2005 | Razzell .................... 375/260 |

OTHER PUBLICATIONS

"Sensitivity to Doppler Shift and Carrier Frequency Errors in OFDM Systems—The Consequences and Solutions" by Y. Zhao et al; Vehicular Technology Conference, 1996. Mobile Technology for the Human Race, IEEE 46$^{th}$ Atlanta, GA, Apr. 28-May 1, 1996, New York, NY, IEEE, US, vol. 3, Apr. 28, 1996, pp. 1564-1568.

"Intercarrier Interference Self-Cancellation Scheme for OFDM Mobile Communication Systems" by Y. Zhao et al, IEEE Transactions on Communications, IEEE Service Center, Piscataway, NJ, vol. 49, No. 7, Jul. 2001, pp. 1185-1191.

"Active Interference Cancellation Technique for MB-OFDM Cognitive Radio" by H. Yamaguchi, Microwave Conference, 2004, 34$^{th}$ European Amsterdam, The Netherlands Oct. 13, 2004, Piscataway, NJ, IEEE, Oct. 13, 2004, pp. 1105-1108.

"Active Interference Cancellation Technique for MB-OFDM Cognitive Radio" by H. Yamaguchi, 34$^{th}$ European Microwave Week Conference, Amsterdam, Netherlands, Oct. 11-15, 2004, pp. 1105-1108.

Korean Final Rejection dated Aug. 21, 2009, 2 pages English translation and 2 pages Korean original; 4 pages total.

* cited by examiner

*Primary Examiner*—Aung S Moe
*Assistant Examiner*—Curtis A Alia (57) ABSTRACT

This invention relates to a method, a computer program, a computer program product, a transmitter and a receiver for a multicarrier modulation, wherein symbols are assigned to carriers of a set of N carriers, the method comprising assigning at least one of the symbols to a first carrier of the set of N carriers, and assigning an antipodal representative of the at least one of the symbols to a second carrier of the set of N carriers.

12 Claims, 7 Drawing Sheets

MULTICARRIER MODULATION WITH ENHANCED FREQUENCY CODING

FIELD OF THE INVENTION

This invention relates to a method for multicarrier modulation, wherein symbols are assigned to carriers of a set of N carriers.

BACKGROUND OF THE INVENTION

The Ultra Wide Band (UWB) technology, which may be used for the physical layer for a low-power short distance (up to 10 m) radio transmission technique for high data rates, may for instance be implemented by a multicarrier modulation. Said multicarrier modulation may be represented by an Orthogonal Frequency Division Multiplexing (OFDM) modulation, a Multi Band (MB) OFDM modulation or any other multicarrier modulation.

However, said multicarrier UWB system often has to coexist with at least one narrowband radio service that operates within the spectrum of said UWB system. In general, said narrowband radio system has any bandwith that is smaller than the UWB system's bandwith. Thus, said narrowband system looks like an interferer for at least one of the carriers of said multicarrier UWB system, and, more problematically, an active UWB system looks like an increased noise level for said narrowband transmission system. To minimize this interference affecting said narrowband radio service, the UWB system's transmitting power in the frequency spectrum of said narrowband radio service has to be limited.

Most notably, the Active Interference Cancellation (AIC) Technique, presented by Hirohisa Yamaguchi on the $34^{th}$ European Microwave Week Conference, which has been held in Amsterdam, Netherlands on 11-15 Oct. 2004, has been introduced to mitigate the level of interference produced by UWB MB-OFDM radio systems to narrowband systems. Said AIC Technique is published in the conference proceedings of said $34^{th}$ European Microwave Week under the title "Active Interference Cancellation Technique for MB-OFDM Cognitive Radio", on pages 1105-1108. At first, the carriers of said MB-OFDM system that fall within the narrowband reception band, in the following called victim receiver's band, are nulled out. In OFDM and also in MB-OFDM, any carriers are placed at a regular frequency interval to avoid inter-carrier interference, but due to the properties of sinc-function, which characterizes the spectrum of an OFDM carrier, the inter-carrier interference between the carrier-frequencies becomes large. Thus, nulling the carriers that fall within the victim receiver's band does not normally lead to a sufficient limitation of transmit power in said victim receiver's band, as the remaining active carriers introduce interference concerning the spectrum in between the carrier frequencies of said nulled carriers. Particularly, most of said interference is determined by the tones of the active carriers neighbored to said nulled carriers. Hence, said AIC approach proposes to calculate the two tones associated to the carriers located on each side of the victim receiver's band in order to minimize the interference inside the victim receiver's band. Said two tones are denoted as AIC tones in the following. In order to calculate the AIC tones, the carriers that fall within the victim receiver's band are nulled and the carriers corresponding to the AIC tones are also nulled. Afterwards, the 128-point IFFT of the signal, which is appropriately defined by data carriers, pilot carriers, guard carriers and said nulled carriers, is calculated to obtain the corresponding frequency spectrum. In order to evaluate the amount of interference that is still present over the victim receiver's bandwith, the 128K-IFFT with an upsampling factor K is applied to said signal and the MB-OFDM spectrum is interpolated. Then, the total MB-OFDM interference power that exists over each frequency point within the victim receiver's band is calculated, and the two optimal AIC coefficients are obtained by applying the minimum mean squared error approach in order to minimize the total MB-OFDM interference that exists over the victim receiver's band. The solution of said minimum mean squared error optimization problem requires a matrix inversion. Afterwards, the quantized AIC coefficient values are assigned to said AIC tones that are associated with the carriers placed on each side of the victim receiver's band. Finally, the MB-OFDM signal, including the AIC tones, is transmitted.

However, the AIC approach leads to high complexity, as it requires interpolation of the frequency domain signal and calculation of a matrix inverse in order to solve the minimum mean squared error optimization problem. Moreover, the quantization of the AIC coefficients limits algorithm performance.

SUMMARY OF THE INVENTION

In view of the above-mentioned problem, it is, inter alia, an object of the present invention to provide a method, a computer program, a computer program product, a system, a transmitter and a receiver for mitigating interference introduced by a multicarrier modulation that is implementable with a simple setup.

A method is proposed for multicarrier modulation, wherein symbols are assigned to carriers of a set of N carriers, said method comprising assigning at least one of said symbols to a first carrier of said set of N carriers, and assigning an antipodal representative of said at least one of said symbols to a second carrier of said set of N carriers.

Said multicarrier modulation may for instance be an Orthogonal Frequency Domain Multiplexing (OFDM) modulation, a Multi Band (MB) OFDM modulation or any other modulation providing at least two carriers for transmission. Said MB-OFDM is an extension to OFDM, wherein during each OFDM symbol interval the center frequency can be selected from a set of hopping parameters. Thus, said MB-OFDM may offer a higher frequency diversity in comparison to usual OFDM that uses only a single center frequency.

Said symbols may for instance be phase- and/or amplitude modulated symbols of a limited symbol alphabet, as for instance BPSK, QPSK, 8-PSK, 16-PSK or QAM symbols, and, furthermore, said symbols may be additionally represented by antipodal and/or complex conjugate representatives of said limited symbol alphabet and said symbols may be additionally represented by complex conjugate representatives of said antipodal representatives of said limited symbol alphabet. Moreover, said limited symbol alphabet may vary from symbol to symbol. Said symbols may stem from a stream of possibly source- and/or channel-encoded and/or interleaved data symbols, furthermore said symbols may represent pilot symbols or said symbols may be nulled by setting the amplitude of said symbols to zero.

Said multicarrier modulation is applied to a set of N carriers, wherein N may be defined as $N \in \{2,3,4, \ldots, \infty\}$. Said assignment of symbols to said carriers of said set of N carriers may be understood as a general assignment of said symbols to different carriers of said set of N carriers. Furthermore, at least one of said symbols is assigned to a first carrier of said set of N carriers, and an antipodal representative of said at least one of said symbols is assigned to a second carrier of said set of N carriers. In particular, if α denotes said at least one of said symbols then β=−α represents said antipodal representative. Said set of N carriers may include data carriers as well as guard carriers as well as pilot carriers.

Said set of N carriers forms a multicarrier symbol corresponding to said multicarrier modulation, wherein, for instance, said multicarrier symbol may also comprise in addition at least one guard interval and/or at least one cyclic prefix. Said multicarrier symbol may be transmitted over wireless or wire-bound transmission channels, wherein said transmission may comprise further signal processing such as spreading, filtering, and RF-modulation.

Said assignment of said at least one of said symbols to said first carrier, and said assignment of said antipodal representative of said at least one of said symbols to said second carrier may introduce frequency domain spreading. Said frequency domain spreading may be used by a receiver to improve the detection by, for instance, applying methods and/or algorithms that process a received frequency domain spreaded signal transmitted by a transmitter carrying out said frequency domain spreading.

The present invention achieves a reduction of interference in between the carrier frequencies of the carriers of said multicarrier modulation, as the residual sidelobe power over the entire of said multicarrier modulation is reduced. This desirable feature is accomplished by assigning at least one of said symbols to a first carrier of said set of carriers, and assigning an antipodal representative of said symbol to a second carrier of said set of carriers. Thus, in contrast to prior art, no further amount of implementation is required and, furthermore, the performance of the present invention is not affected by quantization of the said symbols.

According to an embodiment of the present invention, carrier frequencies of said first carrier and said second carrier are assigned to adjacent carrier frequencies, so that said at least one of said symbols and said antipodal representative of said at least one of said symbols are associated with at least one of a couple of two neighbored carriers in the frequency spectrum. Thus said first carrier is assigned to one carrier of said couple of two neighbored carriers and said second carrier is assigned to the other carrier of said couple of two neighbored carriers.

According to an embodiment of the present invention, said multicarrier modulation represents a Multi Band (MB) OFDM modulation. For said MB-OFDM at least one frequency band group is defined, wherein each of said at least one frequency band groups includes at least one sub-band, and wherein each of said sub-bands comprises said set of N carriers. Thus over each of said sub-bands OFDM symbols consisting of N carriers are sent, and each of said sub-band is associated with an own center frequency to arrange said sub-band in the corresponding frequency band group. During each OFDM symbol interval, said center frequency can be selected according to the sub-band that should be used for transmission. Said MB-OFDM modulation may be associated with at least two of said sub-bands, hence said MB-OFDM may exploit frequency diversity. Furthermore, the carrier frequencies of said first and said second carrier may be assigned to adjacent carrier frequencies.

According to an embodiment of the present invention, a complex conjugate representative of said at least one of said symbols, which is associated with said first carrier, is assigned to a third carrier, and a complex conjugate representative of said antipodal representative, which is associated with said second carrier, is assigned to a fourth carrier. Said additional assignment of said complex conjugate representatives to said third and said fourth carrier may introduce a frequency domain spreading, which may be used by a receiver to improve the detection by, for instance, applying methods and/or algorithms that process a received frequency domain spreaded signal transmitted by a transmitter carrying out said frequency domain spreading. In case that said at least one of said symbols is real-valued, said complex conjugate representative of said at least one of said symbols represents exactly said at least one of said symbols, and, furthermore, said complex conjugate representative of said antipodal representative represents exactly said antipodal representative. Particularly, the carrier frequencies of said first and said second carrier may be assigned to adjacent carrier frequencies.

According to an embodiment of the present invention, said set of N carriers is associated with a set of N carrier frequencies, wherein each carrier frequency is represented by $f_i$ with index $i \in \{0,1,\ldots,N-1\}$, and wherein said carrier frequencies $f_i$ are arranged via index i by an increasing order of said carrier frequencies, and wherein a carrier frequency of said first carrier is represented by $f_k$ with $k \in \{0,1,\ldots,N-1\}$, and wherein a carrier frequency of said second carrier is represented by $f_l$, wherein $l \in \{0,\ldots,N-1\}$ and $l \neq k$ holds; and wherein a carrier frequency $f_{N-1-k}$ is associated with said third carrier and wherein a carrier frequency $f_{N-1-l}$ is associated with said fourth carrier. Said relation between the carrier frequency of said first carrier and the carrier frequency of said third carrier, and said relation between the carrier frequency of said second carrier and the carrier frequency of said fourth carrier may introduce a frequency domain spreading via complex conjugate symmetry. Said frequency domain spreading via complex conjugate symmetry may be used by a receiver to improve the detection by, for instance, applying methods and/or algorithms that process a received frequency domain spreaded signal transmitted by a transmitter carrying out said frequency domain spreading. Furthermore, the carrier frequencies of said first carrier and said second carrier may be located in the lower half of the frequency spectrum spanned by the complete set of said N carriers. Particularly, the carrier frequencies of said first and said second carrier may be assigned to adjacent carrier frequencies ($|l-k|=1$), therewith said third carrier and said fourth carrier would also have adjacent carrier frequencies.

According to an embodiment of the present invention, an association of at least one carrier of said set of N carriers with at least one of said symbols and said antipodal representative of said at least one symbol is the same for a first and a second symbol period of said multicarrier modulation. Said symbol period of said multicarrier modulation can be associated with a symbol of said multicarrier modulation, which is formed by said set of N carriers, and which will be denoted as multicarrier symbol in the following. Said multicarrier modulation may be represented by an OFDM modulation, a MB-OFDM modulation or any other multicarrier modulation. Said association introduces a time domain spreading, as at least one of said symbols and said antipodal representatives is associated with the same carrier for said first and said second symbol period, and thus at least one of said symbols and said antipodal representatives is repeated over at least two symbol periods. Said time domain spreading may also be understood, that even the complete multicarrier symbol corresponding to said first symbol period may be reused by assigning said multicarrier symbol to the multicarrier symbol corresponding to said second symbol period. In the case that said multicarrier modulation is represented by MB-OFDM modulation, wherein the center frequency of the transmitted multicarrier symbols may vary for each symbol period, and thus the carrier frequencies of the carriers of said multicarrier symbol may vary in the radio frequency band for each symbol period, said association of at least one of said symbols and said antipodal representatives with the same carrier for said first and said second symbol period may be understood to be carried out for the baseband multicarrier symbol, wherein the carrier frequency of each carrier of said set of N carriers does not vary. Said time domain spreading may be used by a receiver to improve the detection by, for instance, applying methods and/or algorithms that process a received time domain spreaded signal transmitted by a transmitter carrying out said time domain spreading. Particularly, the carrier frequencies of said first and said second carrier may be assigned to adjacent carrier frequencies.

According to an embodiment of the present invention, an association of at least one of said N carriers with at least one of said symbols and said antipodal representative of said at least one symbol and said complex conjugate representative is the same for a first and a second symbol period of said multicarrier modulation. Analog to the previous embodiment a time domain spreading is introduced by said association. Thus, the preferred embodiments stated in the previous embodiment of the present invention may also be used for this embodiment.

According to an embodiment of the present invention, at least one of said carriers of said set of N carriers is assigned with a null symbol. Said assignment of a null symbol to at least one of said carriers reduces the transmitted power, particularly in the frequency range corresponding to the bandwith and the carrier frequency of said at least one of said carriers. Thus, said assignment of a null symbol to at least one of said carriers may be used to minimize the transmit power of said multicarrier system in at least one arbitrary frequency spectrum that is located in the frequency spectrum of said multicarrier system. Therefore, at least one of said set of N carriers with a carrier frequency located in said at least one arbitrary frequency spectrum may be assigned with a null symbol, wherein for instance any of said carrier of said set of N carriers with a carrier frequency that is located in said at least one arbitrary frequency spectrum may be assigned with a null symbol, but furthermore, also at least on said set of N carriers with a carrier frequency located outside of said at least one arbitrary frequency spectrum may be assigned with a null symbol. Thus, said assignment of at least one of said carriers of said set of N carriers with a null symbol may be used to mitigate the transmit power introduced by said multicarrier system in at least one frequency spectrum, that may be used by at least one narrowband radio system for instance. Particularly, the carrier frequencies of said first and said second carrier may be assigned to adjacent carrier frequencies. Furthermore, said assignment of said null symbol to at least one of said carriers may also be understood, that the amplitude of said at least one of said carriers is set to zero or near to zero.

According to an embodiment of the present invention, at least two carriers of said set of N carriers are assigned with a null symbol, and wherein at least one pair of carriers of said at least two carriers of said set of N carriers has two carriers with adjacent carrier frequencies. Said assignment of at least two carriers with a null symbol reduces the transmitted power, particularly in the frequency range corresponding to the bandwith and the carrier frequency of said at least two carriers. Thus, said assignment of at least two carriers with a null symbol, wherein at least one pair of carriers of said at least two carriers has two carriers with adjacent carrier frequencies, may be used to minimize the transmit power of said multicarrier system in at least one arbitrary frequency spectrum that is located in the frequency spectrum of said multicarrier system. Furthermore, said assignment of said null symbol to at least two of said carriers, wherein at least one pair of carriers of said at least two carriers has two carriers with adjacent carrier frequencies may also be understood, that several pairs of carriers of said at least two carriers have two carriers with adjacent carrier frequencies respectively. Said assignment of said null symbol to at least two of said carriers may also be understood, that the amplitude of said at least two of said carriers is set to zero or near to zero. Particularly, the carrier frequencies of said first and said second carrier may be assigned to adjacent carrier frequencies.

According to an embodiment of the present invention, said multicarrier modulation is used as an UltraWideband radio for Wireless Personal Area Networks (WPANs). For instance, said Ultrawideband (UWB) radio may be used according to the IEEE 802.15.3 body as the standard communication protocol for Wireless Personal Area Networks (WPANs). Said multicarrier modulation may be represented by an MB-OFDM that may be used over the 3.1-10.6 GHz band. Said MB-OFDM may be represented by at least one band group, wherein each of said at least one band group may be associated with at least one 528 MHZ sub-band, over which OFDM symbols consisting of 128 tones associated with N=128 carriers, are sent. During each symbol interval, the center frequency for transmission may be selected from a set of hopping patterns that are defined for the band group that is being used. Furthermore, said multicarrier modulation may apply time domain and/or frequency domain spreading. Particularly, the carrier frequencies of said first and said second carrier may be assigned to adjacent carrier frequencies.

According to an embodiment of the present invention, said multicarrier modulation operates on any of data rates of 53.3 Mbps, 80 Mbps, 106.7 Mbps, 160 Mbps and 200 Mbps. In particular, the preferred embodiments stated in the previous embodiment of the present invention may also be used for this embodiment with said data rates.

A method is proposed for multicarrier modulation, wherein symbols are assigned to carriers of a set of N carriers, said method comprising assigning at least one of said symbols to a first carrier, wherein said first carrier is weighted with a factor w, and assigning said at least one of said symbols to a second carrier, wherein said second carrier is weighted with the antipodal factor −w with respect to said factor w. Thus, said method may be seen as an alternative to the first claim, wherein said at least one of said symbols is assigned to said first carrier, and wherein an antipodal representative of said at least one of said symbols is assigned to said second carrier. Said method with said carrier weighting may decrease implementational costs, as said antipodal representative of said at least one of said symbols must not be calculated for every of said at least one of said symbols. Said factor w may be a complex- or real-valued number, and, furthermore, said factor may be represented by w=1. Said method may be seen as an alternative with respect to the above stated assignment of said at least one of said symbols to said first carrier, and said assignment of said antipodal representative of said at least one of said symbols to said second carrier. Thus each of the above stated embodiments of the invention may also be used for the invention of said method with said carrier weighting. Particularly, the carrier frequencies of said first and said second carrier may be assigned to adjacent carrier frequencies.

A computer program stored on a computer readable medium is further proposed with instructions operable to cause a processor to perform the above-mentioned method steps of said assignment of said at least one of said symbols to said first carrier and said assignment of said antipodal representative of said at least one of said symbols to said second carrier. Furthermore, said computer program may further include instructions operable to cause a processor to perform the method steps of the above-mentioned embodiments related to said assignment of said at least one of said symbols to said first carrier and said assignment of said antipodal representative of said at least one of said symbols to said second carrier. Said computer program may for instance be loaded into the internal or external memory of a signal processor of a transmitter or receiver.

A computer program stored on a computer readable medium is further proposed with instructions operable to cause a processor to perform the above-mentioned method steps of said assignment of said at least one of said symbols to a first carrier, wherein said first carrier is weighted with a factor w, and of said assignment of said at least one of said symbols to a second carrier, wherein said second carrier is weighted with the antipodal factor −w with respect to said factor w. Said computer program product may for instance be stored on any fixed or removable storage medium such as a RAM, a ROM, a cache, a memory card, a disk or a similar medium.

A multicarrier modulation system is further proposed, wherein symbols are assigned to carriers of a set of N carriers, said system comprising means arranged for assigning at least one of said symbols to a first carrier of said set of N carriers, and means arranged for assigning an antipodal representative of said at least one of said symbols to a second carrier of said set of N carriers. Said system may for instance be a wireless or wire-bound communication system. Furthermore, if the system is wireless, it may be a Wireless Personal Area Network (WPAN).

According to an embodiment of the present invention, said system further comprises means arranged for assigning carrier frequencies of said first carrier and said second carrier to adjacent carrier frequencies.

According to an embodiment of the present invention, said system further comprises means arranged for transmitting a multicarrier signal of said multicarrier modulation, and means arranged for receiving said multicarrier signal of said multicarrier modulation, and means arranged for detecting said symbols. Said multicarrier signal may comprehend of at least one multicarrier modulated symbol, wherein said multicarrier modulated symbol is formed by said set of N carriers. Furthermore, said multicarrier signal may comprehend at least one cyclic prefix and/or at least one guard interval. Said symbols, which are detected by said means arranged for detecting said symbols, may also include said antipodal representative of at least one of said symbols, and may also include at least one complex conjugate representative of at least one of said symbols, and may also include at least one complex conjugate representative of said antipodal representative of at least one of said symbols. Said means for detecting said symbols may use said multicarrier signal for said detection.

A multicarrier modulation transmitter is further proposed, wherein symbols are assigned to carriers of a set of N carriers, said transmitter comprising means arranged for assigning at least one of said symbols to a first carrier of said set of N carriers, and means arranged for assigning an antipodal representative of said at least one of said symbols to a second carrier of said set of N carriers, and means arranged for transmitting a multicarrier signal comprising carriers to which said means for assigning symbols assigned respective symbols. Said multicarrier signal may comprehend at least one multicarrier modulated symbol, wherein said multicarrier modulated symbol is formed by said set of N carriers. Furthermore, said multicarrier signal may comprehend at least one cyclic prefix and/or at least one guard interval. Said transmitter may for instance be deployed in a wireless or a wire-bound communication system.

According to an embodiment of the present invention, said transmitter further comprises means arranged for assigning carrier frequencies of said first carrier and said second carrier to adjacent carrier frequencies.

A receiver is further proposed for receiving a multicarrier signal of a multicarrier modulation, wherein said multicarrier modulation assigns symbols to carriers of a set of N carriers, and for detecting said symbols, said receiver comprising means arranged for detecting said symbols, wherein at least one of said symbols is assigned to a first carrier of said set of N carriers, and wherein an antipodal representative of said at least one of said symbols is assigned to a second carrier of said set of N carriers. Said multicarrier signal may comprehend at least one multicarrier modulated symbol, wherein said multicarrier modulated symbol is formed by said set of N carriers. Furthermore, said multicarrier signal may comprehend at least one cyclic prefix or at least one guard interval. Said symbols, which are detected by said means arranged for detecting said symbols, may also include said antipodal representative of at least one of said symbols, and may also include at least one complex conjugate representative of at least one of said symbols, and may also include at least one complex conjugate representative of said antipodal representative of at least one of said symbols. Said receiver may for instance be deployed in a wireless or a wire-bound communication system.

According to an embodiment of the present invention, said receiver further comprises means arranged for detecting said symbols, wherein carrier frequencies of said first carrier and said second carrier are assigned to adjacent carrier frequencies.

According to an embodiment of the present invention, said receiver further comprises means arranged for detecting said symbols, wherein said means apply at least one of time-domain and frequency-domain detection methods.

These and other aspects of the invention will be apparent from and elucidated with reference to the embodiments described hereinafter.

DETAILED DESCRIPTION OF THE INVENTION

The present invention proposes to mitigate interference introduced by a multicarrier modulation, wherein symbols are assigned to carriers of a set of N carriers, by assigning at least one of said symbols to a first carrier of said set of N carriers, and by assigning an antipodal representative of said at least one of said symbols to a second carrier of said set of N carriers.

Figure 1:
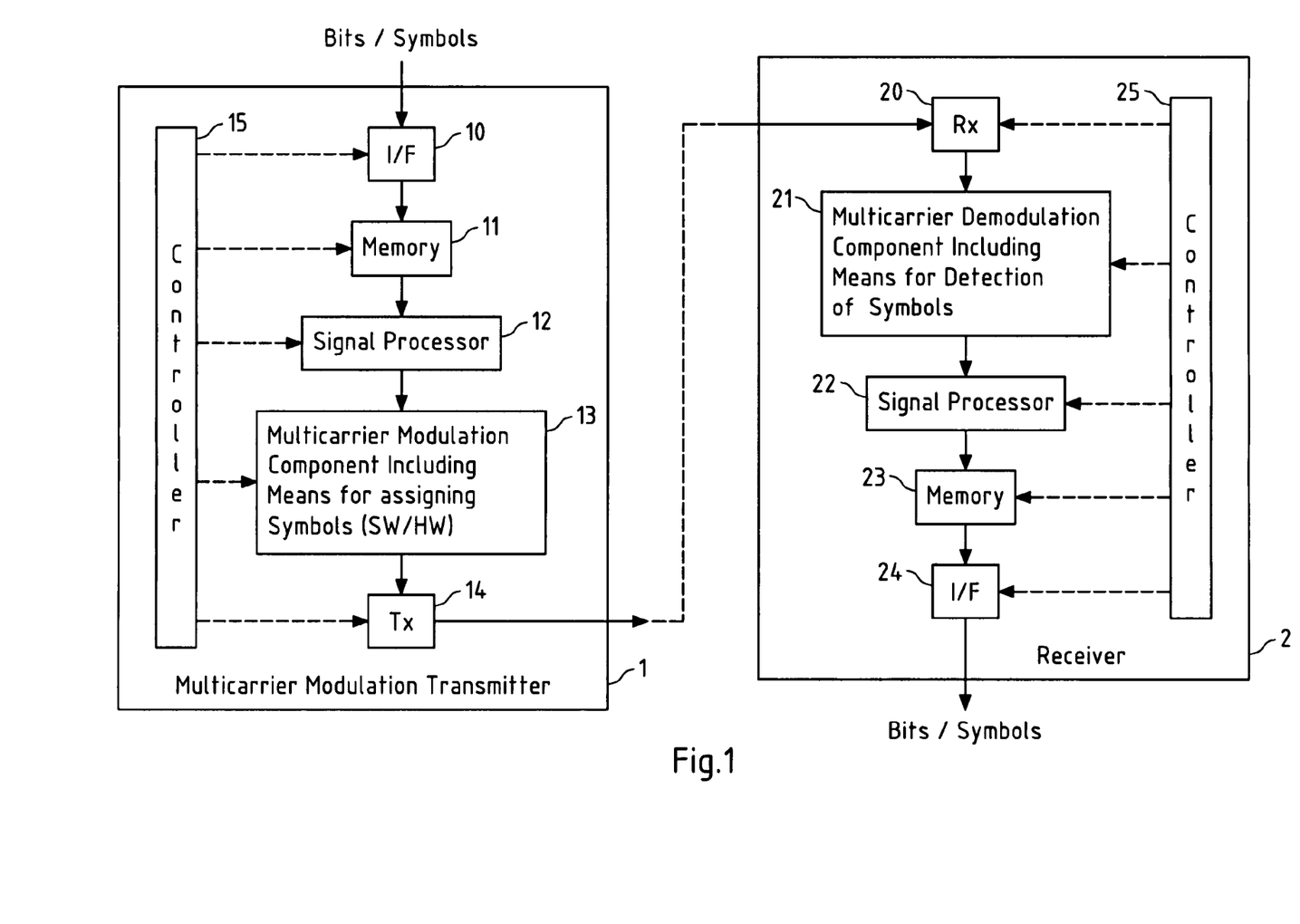
FIG. 1: a schematic presentation of a multicarrier modulation system according to the present invention, wherein a multicarrier modulation transmitter transmits a multicarrier signal to a receiver.

FIG. 1 schematically depicts a multicarrier modulation system according to the present invention, wherein a multicarrier modulation transmitter 1 transmits a multicarrier signal according to the present invention to a receiver 2.

The transmitter 1 comprises an interface 10 which may be connected to any source of bits and/or symbols to be transmitted. These bits and/or symbols then may for instance be stored in the memory 11 of said transmitter. The signal processor 12 may perform operations like channel encoding, interleaving or further operations to fulfill the requirements of the ISO/OSI protocol stack. However, said signal processor 12 may also be used for directly feeding said bits and/or symbols to instance 13. In order to be able to transmit said signal processed bits and/or symbols a multicarrier modulation according to the present invention is performed by a multicarrier modulation component 13 including means for assigning symbols. Said multicarrier modulation component 13 maps the signal processed bits and/or symbols to symbols of a limited symbol alphabet according to a phase- and/or amplitude modulation, as for instance BPSK, QPSK, 8-PSK, 16-PSK or QAM. Afterwards, said multicarrier modulation component 13 assigns said symbols of said limited symbol alphabet to carriers of a set of N carriers according to the present invention, so that at least one of said symbols is assigned to a first carrier of said set of N carriers, and an antipodal representative of said at least one of said symbol is assigned to a second carrier of said set of N carriers. Furthermore, any of the embodiments according to the present invention stated in the summary of invention may also be carried out by said multicarrier modulation component 13. Finally, said multicarrier modulation component 13 forms a multicarrier signal comprehending at least one multicarrier modulated symbol, wherein said multicarrier modulated symbol is formed by said set of N carriers. Said multicarrier signal may comprehend at least one cyclic prefix and/or at least one guard interval. Said multicarrier modulation component 13 may be implemented in hardware and/or software. Instance 13 outputs said multicarrier signal that is transmitted by instance 14, which acts as an interface to the wireless or wire-bound transmission channel. All instances 10, 11, 12, 13 and 14 of transmitter 1 are controlled by a control unit 15.

At receiver 2, which is considered as specific receiver here, the multicarrier signal is received via an instance 20, and then fed into a multicarrier demodulation unit 21 including means for detection of symbols. Said detected symbols are then fed to a signal processor 22. In particular, in said multicarrier demodulation unit 21 said multicarrier signal is demodulated in order to detect said symbols which have been assigned to said carriers correspondingly to instance 13, and wherein said detection may take information of said assignment into account. Signal processor 22 functionally corresponds to signal processor 12 located in the transmitter. Thus, for instance, channel decoding and/or deinterleaving may be carried out by instance 22. This signal processor 22 feeds signal processed bits and/or symbols to memory 23, which is connected to an interface 24. All instances 20, 21, 22, 23 and 24 of receiver 2 are controlled by a control unit 25.

In the following, for illustrative purposes, the presentation will concentrate on Multi Band (MB) OFDM modulation, which is as a variant of UltraWideband radio (UWB), proposed to IEEE 802.15.3a as the standard communication protocol for Wireless Personal Area Networks (WPANs).

Said MB-OFDM is an extension to OFDM that is used over the 3.1-10.6 GHz band. Each sub-band of said MB-OFDM has a bandwith of 528 MHz, over which OFDM symbols consisting of 128 tones are sent. During each OFDM symbol interval, the center frequency for transmission can be selected from a specified set of hopping parameters. The system is designed so that each transmission only occupies 528 MHz at a time, so that the radio signal always meets the FCC's 500 MHz bandwith requirement for UWB transmission. The current PHY Specification (1.0) of said system supports data rates of 53.3, 80, 106.7, 160, 200, 320, 400 and 480 Mbps (as at July 2005).

Said MB-OFDM system uses 100 data carriers, 12 pilot carriers and 10 guard carriers, for a total of 122 carriers. The 6 remaining carriers (including DC) carry null values. Said set of N=128 carriers is associated with a set of 128 carrier frequencies, wherein each carrier frequency is represented by $f_i$ with logical index $i \in \{0,1,\ldots,127\}$, and wherein said carrier frequencies are arranged via logical index i by the increasing order of said carrier frequencies, so that. Thus, for instance carrier i=63 with the corresponding carrier frequency $f_{63}$ represents the DC carrier of said set of N=128 carriers in the baseband. Two carriers of said set of carriers with adjacent carrier frequencies have a frequency spacing of 4.125 MHz.

This invention may be used to control the amount of interference that a MB-OFDM transmitter introduces to Radio Astronomy Services (RAS), Earth Exploration Satellite Services (EESS), Fixed Services (FD) and other narrowband radio systems that will also operate over said 3.1-10.6 GHz band.

As an example for the application of the present invention, in the following we will present three embodiments of MB-OFDM PHY suitable for said WPANs. The first and second embodiments, denoted as PHY Option 1 and PHY Option 2, respectively, are suitable for said 53.3 and 80 Mbps modes, whereas the third embodiment, denoted as PHY Option 3, is suitable for said 106.7, 160 and 200 Mbps modes.

First Embodiment of the Present Invention

As an example for the application of the present invention, said MB-OFDM modulation for said 53.3 and 80 Mbps operational modes of said WPANs is considered and an embodiment of the present invention is given therefore.

Figure 2:
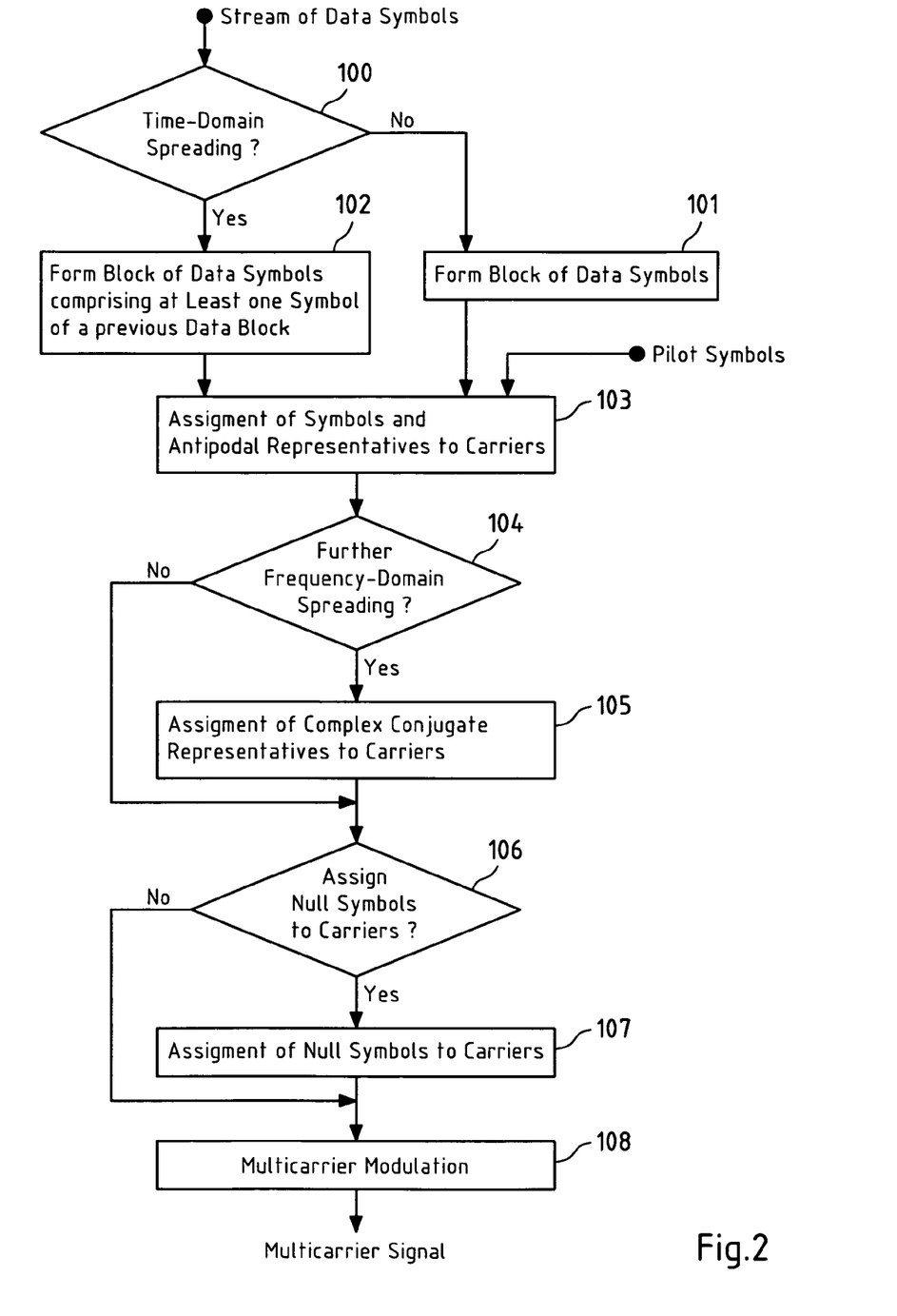
FIG. 2: a flowchart of a method for mitigation of interference introduced by a multicarrier modulation according to the present invention.

The implementation of the present example is according to FIG. 2, which depicts a flowchart of a method for mitigation of interference introduced by a multicarrier modulation according to the present invention, and wherein said flowchart describes operational steps of a multicarrier modulation component 13 including means for assigning symbols within a transmitter 1 depicted in FIG. 1.

In the present example, a stream of 50 QPSK data symbols $\{c_0, \ldots, c_{49}\}$ is received for every other OFDM symbol interval. In a step 100, it is checked whether time-domain spreading should be applied or not. As this is not the case in the present example, during the first OFDM symbol interval the subset $S_1=\{c_0, \ldots, c_{24}\}$ of said data symbols is formed as a block of data symbols in a step 101, whereas during the second OFDM symbol interval the subset $S_2=\{c_{25}, \ldots, c_{49}\}$ of said data symbols is formed as a block of data symbols in a step 101.

In the following, the baseband processing during said first OFDM symbol interval is explained, whereas subsequently the explanation for said second OFDM symbol interval is given.

During said first OFDM symbol interval, in a step 103, said symbols of said block of data symbols and antipodal representatives of each of said symbols of said block of data symbols are summarized in set $S'_1=\{c_0,-c_0, c_1,-c_1, \ldots, c_{24},-c_{24}\}$ of 50 symbols, and said set $S'_1$ is assigned to 50 carriers of said set of 128 carriers with the logical indices $\{7,8,11,12, \ldots, 27,28,31,32, \ldots, 47,48,51,52, \ldots, 61,62\}$ corresponding to their carrier frequencies. Thus said set $S'_1$ is mapped to the data carriers below DC, and each symbol of said data symbols and an antipodal representative of said each symbol of said data symbols are mapped to two adjacent carrier frequencies.

Furthermore, in a step 103, selected symbols of said block of data symbols, corresponding antipodal representatives of said selected symbols, and a null symbol are summarized as guard symbols in set $G_1=\{\text{Null}, c_0,-c_0, c_1,-c_1\}$, and said set $G_1$, is assigned to 5 carriers of said set of 128 carriers with the logical indices $\{2,3, \ldots, 6\}$ corresponding to their carrier frequencies. Thus said set $G_1$ is assigned to guard carriers below DC.

Further, in a step 103, a set of 12 pilot symbols $P=\{P_{-2},-P_{-2}, P_{-1},-P_{-1}, P_0,-P_0, P^*_0,-P^*_0, P^*_{-1},-P^*_{-1}, P^*_{-2},-P^*_{-2}\}$ is mapped to 12 carriers of said set of 128 carriers with the logical indices $\{9,10,29,30,49,50,77,78,97,98,117,118\}$ corresponding to their carrier frequencies. Thus said set P is assigned to the pilot carriers.

Then, in a step 103, 6 null symbols are assigned to 6 carriers of said set of 128 carriers with the logical indices $\{0,1,63,64,126,127\}$ corresponding to their carrier frequencies.

In a step 105, complex conjugate representatives of the symbols of said set $S'_1$ are constructed and summarized in set $S''_1=\{-c^*_{24}, c^*_{24},-c^*_{23}, c^*_{23}, \ldots,-c^*_0, c^*_0\}$. Said set $S''_1$ is assigned to 50 carriers of said set of 128 carriers with the logical indices $\{65,66, \ldots, 75,76,79,80 \ldots, 95,96,99, 100, \ldots, 115,116,119,120\}$ corresponding to their carrier frequencies.

Furthermore, in a step 105, complex conjugate representatives of the guard symbols of said set $G_1$ are constructed and summarized in set $G_2=\{-c^*_1, c^*_1,-c^*_0, c^*_0,\text{Null}\}$, and said set $G_2$ is assigned to 5 carriers of said set of 128 carriers with the logical indices $\{121,122,\ldots, 125\}$ corresponding to their carrier frequencies.

In a step 106, it is checked whether carriers of said set of 128 carriers should be assigned with a null symbol. If this is the case, in a step 107 a null symbol may be assigned to any of said set of 128 carriers. Therewith in a step 107, for instance, the carriers that fall across a victim's receiver band may be assigned with a null symbol, furthermore, also other carriers that fall outside of said victim's receiver band may be assigned with a null symbol.

Figure 3:
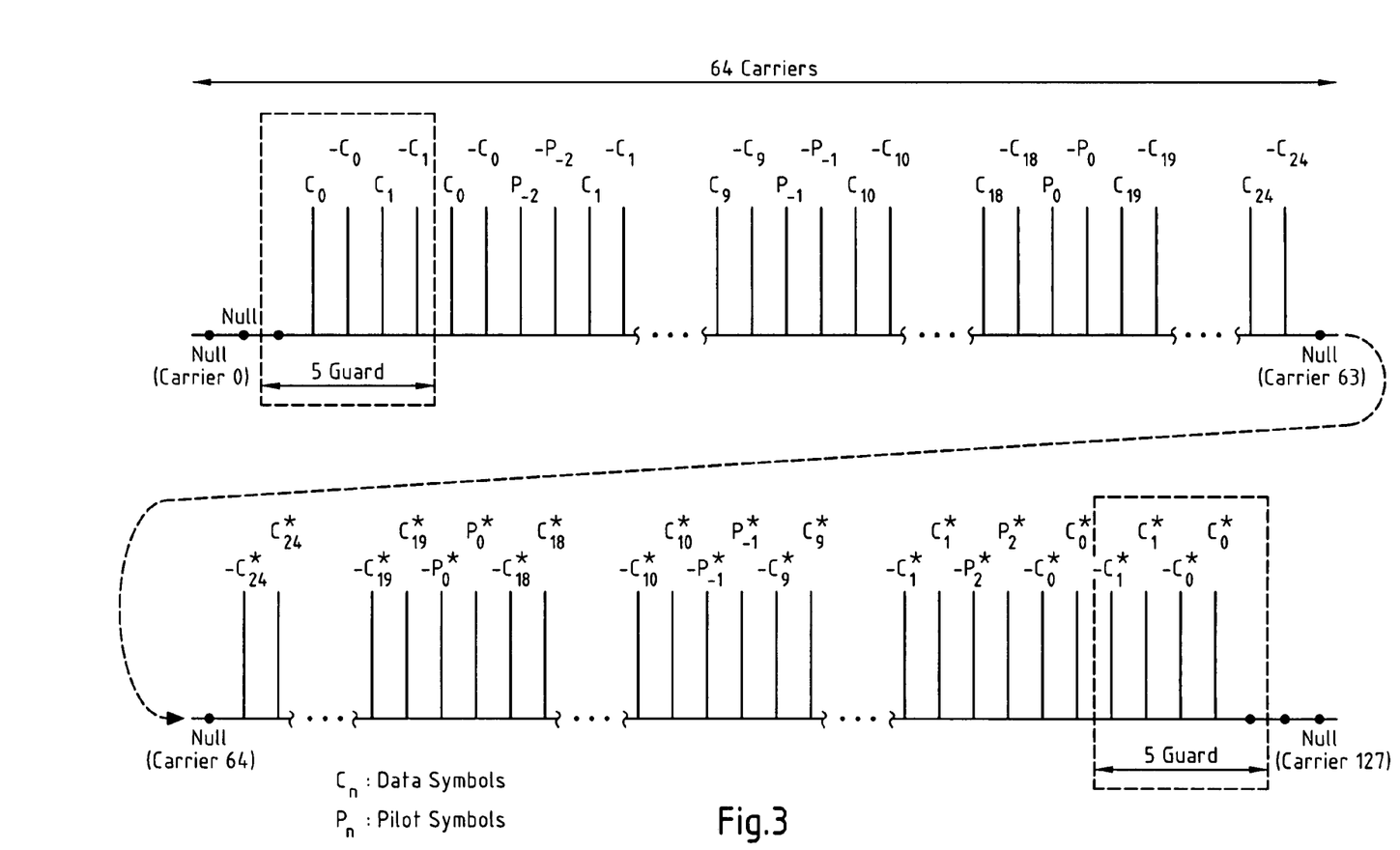
FIG. 3: the assignment of symbols and representatives to carriers during a first OFDM symbol period according to the first preferred embodiment of the present invention without an assignment of additional null symbols to carriers.

Said assignment of symbols and representatives to said set of N=128 carriers of a first OFDM symbol during said first OFDM symbol interval with respect to this embodiment of the present invention without an assignment of additional null symbols to carriers is depicted in FIG. 3.

Finally, in a step 108, during said first OFDM symbol interval said set of carriers is used as input to an IFFT and inverse transformed to a first OFDM symbol in the time domain for transmission. Furthermore, in a step 108, additional baseband processing concerning modulation may be carried out. For instance, further guard intervals and/or a cyclic prefix may be attached to said OFDM symbol to form said multicarrier signal. Only baseband processing is considered here. It is understood that further processing such as pulse shaping, filtering and RF modulation is required to actually transmit the multicarrier signal, and wherein said pulse shaping, filtering and RF modulation may be performed by instance 14.

In the following, the baseband processing during said second OFDM symbol interval is explained.

During said second OFDM symbol interval, in a step 103, said symbols of said block $S_2$ of data symbols and antipodal representatives of each of said symbols of said block of data symbols are summarized in set $S'_2=\{-c_{25}, c_{25},-c_{26}, c_{26}, \ldots, -c_{49}, c_{49}\}$ of 50 symbols, and said set $S'_2$ assigned to 50 carriers with the logical indices $\{7,8,11,12, \ldots, 27,28,31, 32, \ldots, 47,48,51,52, \ldots, 61,62\}$ corresponding to their carrier frequencies. Thus said set $S'_2$ is mapped to the data carriers below DC, and each symbol of said data symbols and an antipodal representative of said each symbol of said data symbols are mapped to two adjacent carrier frequencies.

Furthermore, in a step 103, selected symbols of said block of data symbols, corresponding antipodal representatives of said selected symbols, and a null symbol are summarized as guard symbols in set $G_1=\{\text{Null}, c_{25},-c_{25}, c_{26},-c_{26}\}$, and said set $G_1$ is assigned to 5 carriers of said set of 128 carriers with the logical indices $\{2,3, \ldots, 6\}$ corresponding to their carrier frequencies. Thus said set $G_1$ is assigned to guard carriers below DC.

Further, in a step 103, a set of 12 pilot symbols $P=\{P_{-2},-P_{-2}, P_{-1},-P_{-1}, P_0,-P_0, P^*_0,-P^*_0, P^*_{-1},-P^*_{-1}, P^*_{-2},-P^*_{-2}\}$ is mapped to 12 carriers of said set of 128 carriers with the logical indices $\{9,10,29,30,49,50,77,78,97,98,117,118\}$ corresponding to their carrier frequencies. Thus said set P is assigned to the pilot carriers.

Then, in a step 103, 6 null symbols are assigned to 6 carriers of said set of 128 carriers with the logical indices $\{0,1,63,64,126,127\}$ corresponding to their carrier frequencies.

In a step 105, complex conjugate representatives of the symbols of said set $S'_2$ are constructed and summarized in set $S''_2=\{-c^*_{49}, c^*_{49},-c^*_{48}, c^*_{48}, \ldots, -c^*_{25}, c^*_{25},\}$. Said set $S''_2$ is assigned to 50 carriers of said set of 128 carriers with the logical indices $\{65,66, \ldots, 75,76,79,80 \ldots, 95,96,99, 100, \ldots, 115,116,119,120\}$ corresponding to their carrier frequencies.

Furthermore, in a step 105, complex conjugate representatives of the guard symbols of said set $G_1$ are constructed and summarized in set $G_2=\{-c^*\mathbf{2}_{26}, c^*_{26},-c^*_{25}, c^*_{25}, \text{Null}\}$, and said set $G_2$ is assigned to 5 carriers of said set of 128 carriers with the logical indices $\{121,122,\ldots,125\}$ corresponding to their carrier frequencies.

In a step 106, it is checked whether carriers of said set of 128 carriers should be assigned with a null symbol. If this is the case, in a step 107 a null symbol may be assigned to any of said set of 128 carriers. Therewith in a step 107, for instance, the carriers that fall across a victim's receiver band may be assigned with a null symbol, furthermore, also other carriers that fall outside of said victim's receiver band may be assigned with a null symbol.

Figure 4:
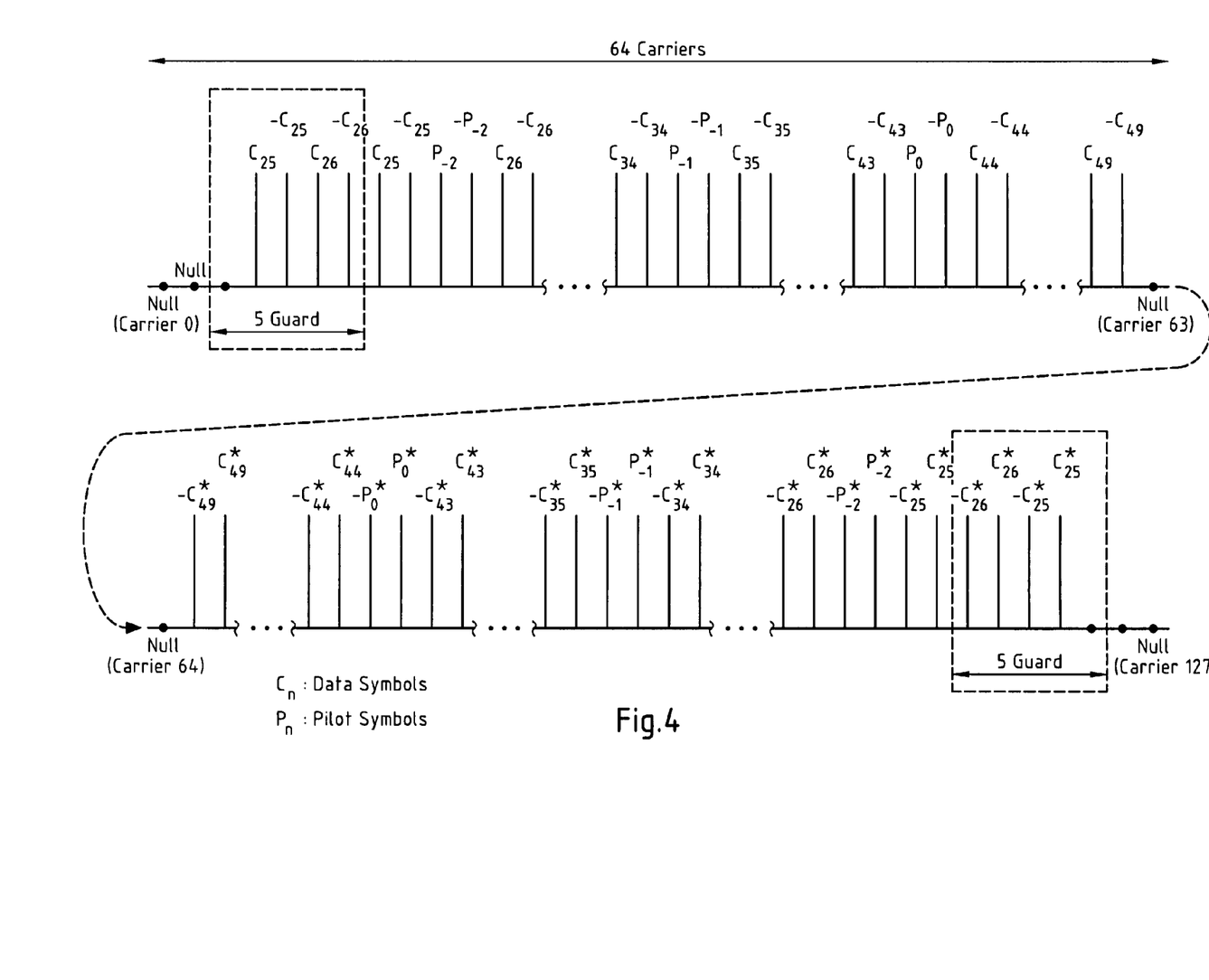
FIG. 4: the assignment of symbols and representatives to carriers during a second OFDM symbol period according to the first embodiment of the present invention without an assignment of additional null symbols to carriers.

Said assignment of symbols and representatives to said set of N=128 carriers of a second OFDM symbol during said second OFDM symbol interval with respect to this embodiment of the present invention without an assignment of additional null symbols to carriers is depicted in FIG. 4.

Finally, in a step 108, during said second OFDM symbol interval said set of carriers is used as input to an IFFT and inverse transformed to a second OFDM symbol in the time domain for transmission. Furthermore, in a step 108, additional baseband processing concerning modulation may be carried out. For instance, further guard intervals and/or a cyclic prefix may be attached to said OFDM symbol to form said multicarrier signal. Only baseband processing is considered here. It is understood that further processing such as pulse shaping, filtering and RF modulation is required to actually transmit the multicarrier signal, and wherein said pulse shaping, filtering and RF modulation may be performed by instance 14.

The invention has been described above by means of exemplary embodiments. It should be noted that there are alternative ways and variations which are obvious to a skilled person in the art and can be implemented without deviating from the scope and spirit of the appended claims.

Second Embodiment of the Present Invention

As a second example for the application of the present invention, said MB-OFDM modulation for said 53.3 and 80 Mbps operational modes of said WPANs is considered and an embodiment of the present invention is given therefore.

The implementation of the present example is according to FIG. 1, which depicts a flowchart of a method for mitigation of interference introduced by a multicarrier modulation according to the present invention, and wherein said flowchart describes operational steps of a multicarrier modulation component 13 including means for assigning symbols within a transmitter 1 depicted in FIG. 1.

In the present example, a stream of 50 QPSK data symbols $\{c_0, \ldots, c_{49}\}$ is received for every other OFDM symbol interval. In a step 100, it is checked whether time-domain spreading should be applied or not. During said first OFDM symbol interval, no time-domain spreading is introduced, thus in a step 101 a data block $S_1=\{c_0, \ldots, c_{49}\}$ is formed. During said second OFDM symbol interval, the present example introduces a time-domain spreading by forming the same data block $S_1=\{c_0, \ldots, c_{49}\}$ in a step 102 as formed during said first OFDM symbol period.

In the following, the baseband processing during said first and said second OFDM symbol interval is explained. The baseband processing during said first and said second OFDM symbol interval is exactly the same, as the same data block $S_1=\{c_0, \ldots, c_{49}\}$ is repeated during the second OFDM symbol period and thus the same OFDM symbol is calculated.

During said first and said second OFDM symbol interval, in a step 103, said symbols of said block of data symbols and antipodal representatives of each of said symbols of said block of data symbols are summarized in the sets $S'_1=\{c_0,-c_0, c_1,-c_1, \ldots, c_{24},-c_{24}\}$ and $S'_2=\{c_{25},-c_{25}, c_{26},-c_{26}, \ldots, c_{49},-c_{49}\}$. Said set $S'_1$ is assigned to 50 carriers of said set of 128 carriers with the logical indices $\{7,8,1\ 1,12,\ldots,27,28, 31,32,\ldots,47,48,51,52,\ldots,6\ 1,62\}$ corresponding to their carrier frequencies, and said set $S'_2$ is assigned to 50 carriers of said set of 128 carriers with the logical indices $\{65, 66,\ldots,75,76,79,80\ldots,95,96,99,100,\ldots,115,116,119,120\}$ corresponding to their carrier frequencies. Thus said set $S'_1$ is mapped to the data carriers below DC, and said set $S'_2$ is mapped to the data carriers above DC, and, further, each symbol of said data symbols and an antipodal representative of said each symbol of said data symbols are mapped to two adjacent carrier frequencies.

Furthermore, in a step 103, selected symbols of said block of data symbols, corresponding antipodal representatives of said selected symbols, and a null symbol are summarized as guard symbols in the sets $G_1=\{Null, c_0,-c_0, c_1,-c_1\}$ and $G_2=\{c_{48},-c_{48}, c_{49},-c_{49}, Null\}$. Said set $G_1$ is assigned to 5 carriers of said set of 128 carriers with the logical indices $\{2,3,\ldots,6\}$ corresponding to their carrier frequencies, and said set $G_2$ is assigned to 5 carriers of said set of 128 carriers with the logical indices $\{121,122,\ldots,125\}$ corresponding to their carrier frequencies.

Further, in a step 103, a set of 12 pilot symbols $P=\{_{-2},-P_{-2}, P_{-1},-P_{-1}, P_0,-P_0, P_1,-P_1, P_2,-P_2, P_3,-P_3\}$ is mapped to 12 carriers of said set of 128 carriers with the logical indices $\{9,10,29,30,49,50,77,78,97,98,117,118\}$ corresponding to their carrier frequencies. Thus said set P is assigned to the pilot carriers.

Then, in a step 103, 6 null symbols are assigned to 6 carriers of said set of 128 carriers with the logical indices $\{0,1,63,64,126,127\}$ corresponding to their carrier frequencies.

In a step 104, it is checked whether a further frequency domain spreading should be applied. This is not the case in the present example.

Thus, in a step 106, it is checked whether carriers of said set of 128 carriers should be assigned with a null symbol. If this is the case, in a step 107 a null symbol may be assigned to any of said set of 128 carriers. Therewith in a step 107, for instance, the carriers that fall across a victim's receiver band may be assigned with a null symbol, furthermore, also other carriers that fall outside of said victim's receiver band may be assigned with a null symbol.

Figure 5:
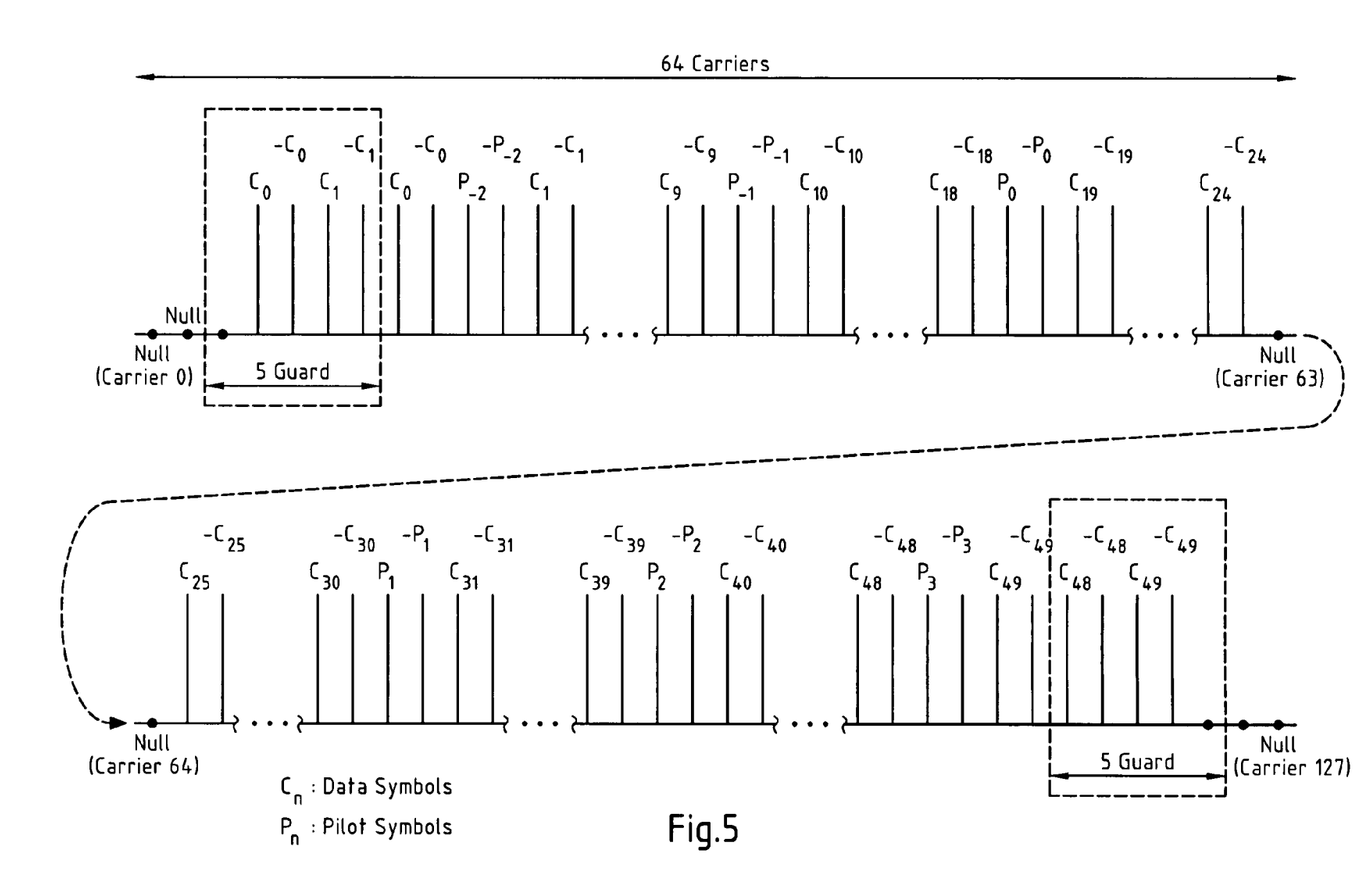
FIG. 5: the assignment of symbols and representatives to carriers during a first OFDM symbol period and during a second OFDM symbol period according to the second embodiment of the present invention without an assignment of additional null symbols to carriers.

Said assignment of symbols and representatives to said set of N=128 carriers of a first and a second OFDM symbol during said first OFDM symbol interval and said second OFDM symbol interval with respect to this embodiment of the present invention without an assignment of additional null symbols to carriers is depicted in FIG. 5.

Finally, in a step 108, during said first and said second OFDM symbol interval said set of carriers is used as input to an IFFT and inverse transformed to a first and a second OFDM symbol in the time domain for transmission. Furthermore, in a step 108, additional baseband processing concerning modulation may be carried out. For instance, further guard intervals and/or a cyclic prefix may be attached to said OFDM symbol to form said multicarrier signal. Only baseband processing is considered here. It is understood that further processing such as pulse shaping, filtering and RF modulation is required to actually transmit the multicarrier signal, and wherein said pulse shaping, filtering and RF modulation may be performed by instance 14.

The invention has been described above by means of exemplary embodiments. It should be noted that there are alternative ways and variations which are obvious to a skilled person in the art and can be implemented without deviating from the scope and spirit of the appended claims.

Third Embodiment of the Present Invention

As a third for the application of the present invention, said MB-OFDM modulation for said 106.7, 160 and 200 Mbps operational modes of said WPANs is considered and an embodiment of the present invention is given therefore.

The implementation of the present example is according to FIG. 1, which depicts a flowchart of a method for mitigation of interference introduced by a multicarrier modulation according to the present invention, and wherein said flowchart describes operational steps of a multicarrier modulation component 13 including means for assigning symbols within a transmitter 1 depicted in FIG. 1.

In the present example, a stream of 100 QPSK data symbols $\{c_0, \ldots, c_{99}\}$ is received for every other OFDM symbol interval. In a step is checked whether time-domain spreading should be applied or not. As this is not the case in the present example, during the first OFDM symbol interval the subset $S_1=\{c_0, \ldots, c_{49}\}$ of said data symbols is formed as a block of data symbols in a step 101, whereas during the second OFDM symbol interval the subset $S_2=\{c_{50}, \ldots c_{99}\}$ of said data symbols is formed as a block of data symbols in a step 101.

In the following, the baseband processing during said first OFDM symbol interval is explained, whereas subsequently the explanation for said second OFDM symbol interval is given.

During said first OFDM symbol interval, in a step 103, said symbols of said block of data symbols and antipodal representatives of each of said symbols of said block of data symbols are summarized in the $S'_{1a}=\{c_0,-c_0, c_1,-c_1, \ldots, c_{24},-c_{24}\}$ and $S'_{1b}=\{c_{25},-c_{25}, c_{26},-c_{26}, \ldots, c_{49},-c_{49}\}$. Said set $S'_{1a}$ is assigned to 50 carriers of said set of 128 carriers with the logical indices $\{7,8,11,12, \ldots ,27,28,31,32, \ldots , 47,48,51,52, \ldots ,61,62\}$ corresponding to their carrier frequencies, and said set $S'_{1b}$ is assigned to 50 carriers of said set of 128 carriers with the logical indices $\{65,66, \ldots ,75,76,79, 80 \ldots ,95,96,99,100, \ldots ,115,116,119,120\}$ corresponding to their carrier frequencies. Thus said set $S'_{1a}$ is mapped to the data carriers below DC, and said set $S'_{1b}$ is mapped to the data carriers above DC, and, further, each symbol of said data symbols and an antipodal representative of said each symbol of said data symbols are mapped to two adjacent carrier frequencies.

Furthermore, in a step 103, selected symbols of said block of data symbols, corresponding antipodal representatives of said selected symbols, and a null symbol are summarized as guard symbols in the sets $G_1=\{Null, c_0,-c_0, c_1,-c_1\}$ and $G_2=\{c_{48},-c_{48}, c_{49},-c_{49}, Null\}$. Said set $G_1$ is assigned to 5 carriers of said set of 128 carriers with the logical indices $\{2,3, \ldots ,6\}$ corresponding to their carrier frequencies, and said set $G_2$ is assigned to 5 carriers of said set of 128 carriers with the logical indices $\{121,122, \ldots ,125\}$ corresponding to their carrier frequencies.

Further, in a step 103, a set of 12 pilot symbols $P=\{P_{-2},-P_{-2}, P_{-1},-P_{-1}, P_0,-P_0,P_1,-P_1, P_2,-P_2, P_3,-P_3\}$ is mapped to 12 carriers of said set of 128 carriers with the logical indices $\{9,10,29,30,49,50,77,78,97,98,117,118\}$ corresponding to their carrier frequencies. Thus said set P is assigned to the pilot carriers.

Then, in a step 103, 6 null symbols are assigned to 6 carriers of said set of 128 carriers with the logical indices $\{0,1,63,64,126,127\}$ corresponding to their carrier frequencies.

In a step 104, it is checked whether a further frequency domain spreading should be applied. This is not the case in the present example.

Thus, in a step 106, it is checked whether carriers of said set of 128 carriers should be assigned with a null symbol. If this is the case, in a step 107 a null symbol may be assigned to any of said set of 128 carriers. Therewith in a step 107, for instance, the carriers that fall across a victim's receiver band may be assigned with a null symbol, furthermore, also other carriers that fall outside of said victim's receiver band may be assigned with a null symbol.

Figure 6:
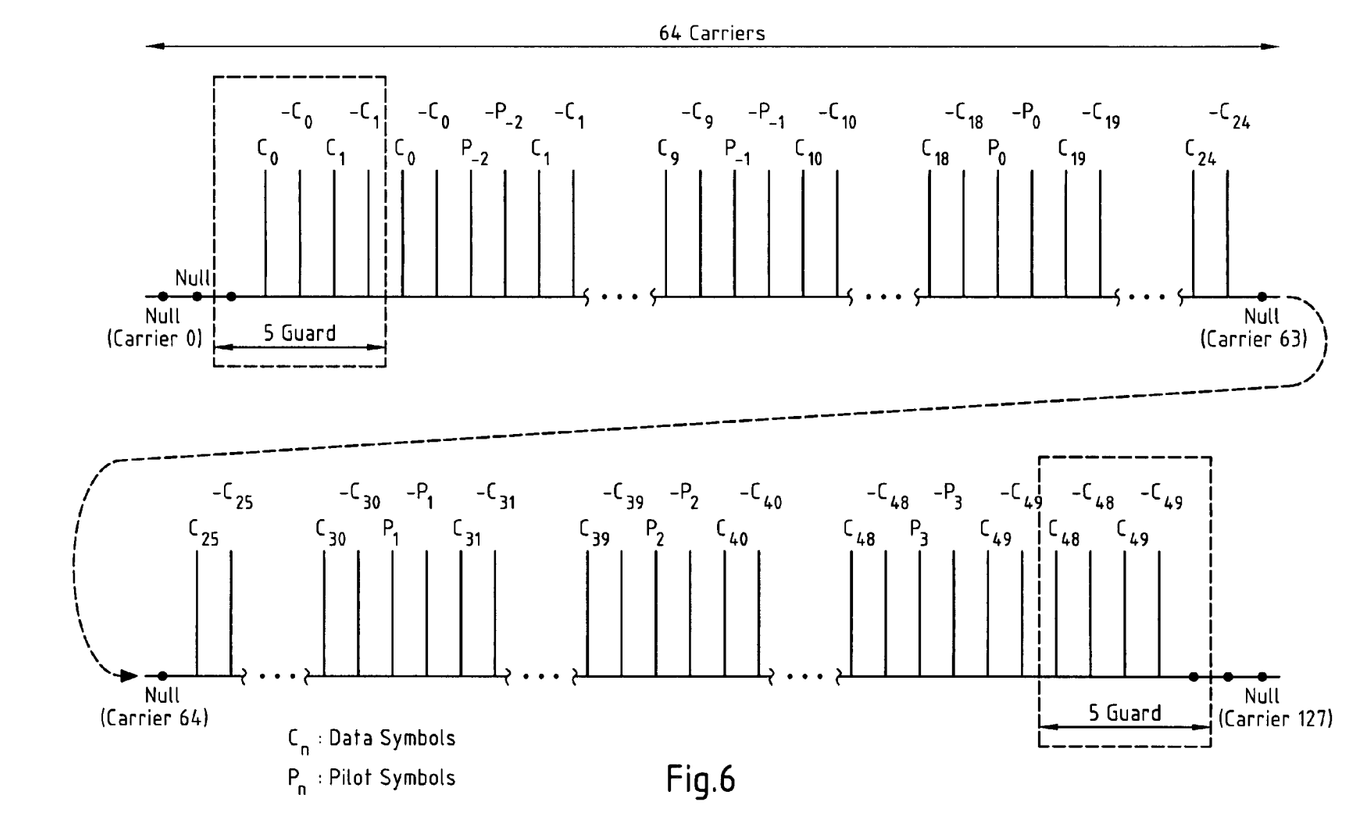
FIG. 6: the assignment of symbols and representatives to carriers during a first OFDM symbol period according to the third embodiment of the present invention without an assignment of additional null symbols to carriers.

Said assignment of symbols and representatives to said set of N=128 carriers of a first OFDM symbol during said first OFDM symbol interval with respect to this embodiment of the present invention without an assignment of additional null symbols to carriers is depicted in FIG. 6.

Finally, in a step 108, during said first OFDM symbol interval said set of carriers is used as input to an IFFT and inverse transformed to a first OFDM symbol in the time domain for transmission. Furthermore, in a step 108, additional baseband processing concerning modulation may be carried out. For instance, further guard intervals and/or a cyclic prefix may be attached to said OFDM symbol to form said multicarrier signal. Only baseband processing is considered here. It is understood that further processing such as pulse shaping, filtering and RF modulation is required to actually transmit the multicarrier signal, and wherein said pulse shaping, filtering and RF modulation may be performed by instance 14.

In the following, the baseband processing during said second OFDM symbol interval is explained.

During said second OFDM symbol interval, in a step 103, said symbols of said block of data symbols and antipodal representatives of each of said symbols of said block of data symbols are summarized in the sets $S'_{2a}=\{c_{50},-c_{50}, c_{51},-c_{51}, \ldots, c_{74},-c_{74}\}$ and $S'_{2b}=\{c_{75},-c_{75}, c_{76},-c_{76}, \ldots, c_{99},-c_{99}\}$. Said set $S'_{2a}$ is assigned to 50 carriers of said set of 128 carriers with the logical indices $\{7,8,11,12,\ldots,27,28,31, 32,\ldots,47,48,51,52,\ldots,61,62\}$ corresponding to their carrier frequencies, and said set $S'_{2b}$ is assigned to 50 carriers of said set of 128 carriers with the logical indices $\{65,66, \ldots ,75,76, 79,80 \ldots ,95,96,99,100, \ldots ,115,116,119,120\}$ corresponding to their carrier frequencies. Thus said set $S'_{2a}$ is mapped to the data carriers below DC, and said set $S'_{2b}$ is mapped to the data carriers above DC, and, further, each symbol of said data symbols and an antipodal representative of said each symbol of said data symbols are mapped to two adjacent carrier frequencies. Furthermore, in a step 103, selected symbols of said block of data symbols, corresponding antipodal representatives of said selected symbols, and a null symbol are summarized as guard symbols in the sets $G_1=\{Null, c_{50},-c_{50}, c_{51},-c_{51}\}$ and $G_2=\{c_{98},-c_{98}, c_{99},-c_{99}, Null\}$. Said set $G_1$ is assigned to 5 carriers of said set of 128 carriers with the logical indices $\{2,3, \ldots ,6\}$ corresponding to their carrier frequencies, and said set $G_2$ is assigned to 5 carriers of said set of 128 carriers with the logical indices $\{121,122, \ldots ,125\}$ corresponding to their carrier frequencies.

Further, in a step 103, a set of 12 pilot symbols $P=\{P_{-2},-P_{-2},P_{-1},-P_{-1},P_0,-P_0,P_1,-P_1,P_2,-P_2,P_3,-P_3\}$ is mapped to 12 carriers of said set of 128 carriers with the logical indices $\{9,10,29,30,49,50,77,78,97,98,117,118\}$ corresponding to their carrier frequencies. Thus said set P is assigned to the pilot carriers. Then, in a step 103, 6 null symbols are assigned to 6 carriers of said set of 128 carriers with the logical indices $\{0,1,63,64,126,127\}$ corresponding to their carrier frequencies.

In a step 104, it is checked whether a further frequency domain spreading should be applied. This is not the case in the present example.

Thus, in a step 106, it is checked whether carriers of said set of 128 carriers should be assigned with a null symbol. If this is the case, in a step 107 a null symbol may be assigned to any of said set of 128 carriers. Therewith in a step 107, for instance, the carriers that fall across a victim's receiver band may be assigned with a null symbol, furthermore, also other carriers that fall outside of said victim's receiver band may be assigned with a null symbol.

Figure 7:
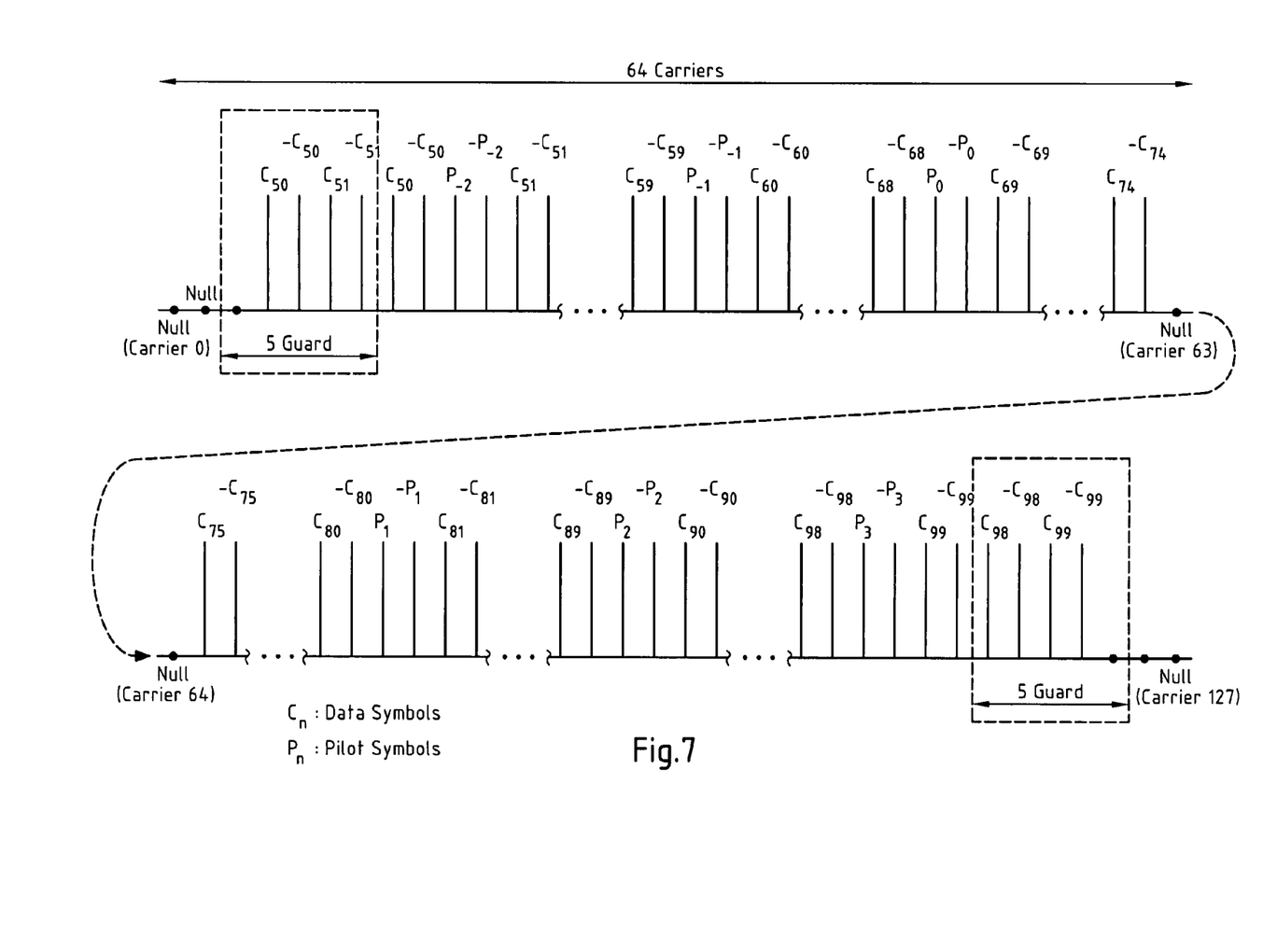
FIG. 7: the assignment of symbols and representatives to carriers during a second OFDM symbol period according to the third embodiment of the present invention without an assignment of additional null symbols to carriers.

Said assignment of symbols and representatives to said set of N=128 carriers of a second OFDM symbol during said second OFDM symbol interval with respect to this embodiment of the present invention without an assignment of additional null symbols to carriers is depicted in FIG. 7.

Finally, in a step 108, during said second OFDM symbol interval said set of carriers is used as input to an IFFT and inverse transformed to a second OFDM symbol in the time domain for transmission. Furthermore, in a step 108, additional baseband processing concerning modulation may be carried out. For instance, further guard intervals and/or a cyclic prefix may be attached to said OFDM symbol to form said multicarrier signal. Only baseband processing is considered here. It is understood that further processing such as pulse shaping, filtering and RF modulation is required to actually transmit the multicarrier signal, and wherein said pulse shaping, filtering and RF modulation may be performed by instance 14.

The invention has been described above by means of exemplary embodiments. It should be noted that there are alternative ways and variations which are obvious to a skilled person in the art and can be implemented without deviating from the scope and spirit of the appended claims.

What is claimed is:

1. A method, comprising:
assigning at least one of a set of symbols to a first carrier of a set of N carriers, and assigning an antipodal representative of said at least one of said set of symbols to a second carrier of said set of N carriers for multicarrier modulation configured to be used in a transmitter and
transmitting by the transmitter the set of symbols on the assigned carriers;
wherein a complex conjugate representative of said at least one of said set of symbols, which is associated with said first carrier, is assigned to a third carrier, and a complex conjugate representative of said antipodal representative, which is associated with said second carrier, is assigned to a fourth carrier, and
wherein said set of N carriers is associated with a set of N carrier frequencies, wherein each carrier frequency is represented by $f_i$ with index $i \in \{0, 1, \ldots, N-1\}$, and wherein said carrier frequencies $f_i$ are arranged via index i by an increasing order of said carrier frequencies, and wherein a carrier frequency of said first carrier is represented by $f_k$ with $k \in \{0, 1, \ldots, N-1\}$, and wherein a carrier frequency of said second carrier is represented by $f_l$, wherein $l \in \{0, \ldots, N-1\}$ and $l \neq k$ holds; and
wherein a carrier frequency $f_{N-1-k}$ is associated with said third carrier and wherein a carrier frequency $f_{N-1-l}$ is associated with said fourth carrier and
wherein carrier frequencies of said first carrier and said second carrier are assigned to adjacent carrier frequencies.

2. The method according to claim 1, wherein said multicarrier modulation represents a Multi Band Orthogonal Frequency Division Multiplexing Modulation.

3. The method according to the claim 1, wherein an association of at least one of said N carriers with at least one of said set of symbols and said antipodal representative of said at least one symbol is the same for a first and a second symbol period of said multicarrier modulation.

4. The method according to the claim 1, wherein an association of at least one of said N carriers with at least one of said set of symbols and said complex conjugate representative of said at least one symbol and said complex conjugate representative is the same for a first and a second symbol period of said multicarrier modulation.

5. The method according to claim 1, wherein at least one of said carriers of said set of N carriers is assigned with a null symbol.

6. The method according to claim 1, wherein at least two carriers of said set of N carriers are assigned with a null symbol, and wherein at least one pair of carriers of said at least two carriers of said set of N carriers has two carriers with adjacent carrier frequencies.

7. A method, comprising:
assigning at least one of a set of symbols to a first carrier of a set of N carriers, wherein said first carrier is weighted with a factor w, and assigning said at least one of said set of symbols to a second carrier of the set of N carriers for multicarrier modulation configured to be used in a transmitter, wherein said second carrier is weighted with the antipodal factor −w with respect to said factor w, wherein carrier frequencies of said first carrier and said second carrier are assigned to adjacent carrier frequencies and
transmitting by the transmitter the set of symbols on the assigned carriers;
wherein a complex conjugate representative of said at least one of said set of symbols, which is associated with said first carrier, is assigned to a third carrier, and a complex conjugate representative of said antipodal representative, which is associated with said second carrier, is assigned to a fourth carrier, and
wherein said set of N carriers is associated with a set of N carrier frequencies, wherein each carrier frequency is represented by $f_i$ with index $i \in \{0, 1, \ldots, N-1\}$, and wherein said carrier frequencies $f_i$ are arranged via index i by an increasing order of said carrier frequencies, and wherein a carrier frequency of said first carrier is represented by $f_k$ with $k \in \{0, 1, \ldots, N-1\}$, and wherein a carrier frequency of said second carrier is represented by $f_l$ wherein $l \in \{0, \ldots, N-1\}$ and $l \neq k$ holds; and
wherein a carrier frequency $f_{N-1-k}$ is associated with said third carrier and wherein a carrier frequency $f_{N-1-l}$ is associated with said fourth carrier.

8. A non-transitory computer-readable storage medium that, when executed by a computer, performs a method according to claim 1.

9. A non-transitory computer-readable storage medium that, when executed by a computer, performs a method according to claim 7.

10. An apparatus, comprising:
at least one processor;
at least one memory including computer program code, the at least one memory and the computer program code configured to, with the at least one processor, cause the apparatus to:
assign at least one of a set of symbols to a first carrier of a set of N carriers, and a component configured to assign an antipodal representative of said at least one of said set of symbols to a second carrier of said set of N carriers for multicarrier modulation, and
assign carrier frequencies of said first carrier and said second carrier to adjacent carrier frequencies; and
a transmitter for transmitting the set of symbols on the assigned carriers;
wherein a complex conjugate representative of said at least one of said set of symbols, which is associated with said first carrier, is assigned to a third carrier, and a complex conjugate representative of said antipodal representative, which is associated with said second carrier, is assigned to a fourth carrier, and wherein said set of N carriers is associated with a set of N carrier frequencies, wherein each carrier frequency is represented by $f_i$ with index $i \in \{0,1, \ldots, N-1\}$, and wherein said carrier frequencies $f_i$ are arranged via index i by an increasing order of said carrier frequencies, and wherein a carrier frequency of said first carrier is represented by $f_k$ with $k \in \{0,1, \ldots, N-1\}$, and wherein a carrier frequency of said second carrier is represented by $f_l$, wherein $l \in \{0, \ldots, N-1\}$ and $l \neq k$ holds; and wherein a carrier frequency $f_{N-1-k}$ is associated with said third carrier and wherein a carrier frequency $f_{N-1-l}$ is associated with said fourth carrier.

11. An apparatus comprising:

at least one processor:

at least one memory including computer program code, the at least one memory and the computer program code configured, with the at least one processor, to cause the apparatus in receipt of a multicarrier signal of a multicarrier modulation to:

receive by a receiver a set of symbols on a set of N carriers, detect symbols of said multicarrier signal, wherein said multicarrier modulation assigns said symbols to carriers of said set of N carriers, wherein at least one of said symbols is assigned to a first carrier of said set of N carriers, and wherein an antipodal representative of said at least one of said symbols is assigned to a second carrier of said set of N carriers, and detect said symbols, wherein carrier frequencies of said first carrier and said second carrier are assigned to adjacent carrier frequencies;

wherein a complex conjugate representative of said at least one of said symbols, which is associated with said first carrier, is assigned to a third carrier, and a complex conjugate representative of said antipodal representative, which is associated with said second carrier, is assigned to a fourth carrier, and wherein said set of N carriers is associated with a set of N carrier frequencies, wherein each carrier frequency is represented by $f_i$ with index $i \in \{0,1, \ldots, N-1\}$, and wherein said carrier frequencies $f_i$ are arranged via index i by an increasing order of said carrier frequencies, and wherein a carrier frequency of said first carrier is represented by $f_k$ with $k \in \{0,1, \ldots, N-1\}$, and wherein a carrier frequency of said second carrier is represented by $f_l$, wherein $l \in \{0, \ldots, N-1\}$ and $l \neq k$ holds; and wherein a carrier frequency $f_{N-1-k}$ is associated with said third carrier and wherein a carrier frequency $f_{N-1-l}$ is associated with said fourth carrier.

12. The apparatus according to claim 11, wherein said at least one memory and said computer program code are further configured cause said apparatus to detect said symbols, wherein said apparatus applies at least one of time-domain and frequency-domain detection methods.

\* \* \* \* \*